US006866228B2

(12) United States Patent
Bartov

(10) Patent No.: US 6,866,228 B2
(45) Date of Patent: *Mar. 15, 2005

(54) AERIAL REFUELING HOSE REEL DRIVE CONTROLLED BY A VARIABLE DISPLACEMENT HYDRAULIC MOTOR AND METHOD FOR CONTROLLING AERIAL REFUELING HOSE REEL

(76) Inventor: Asher Bartov, 603 N. Linden Dr., Beverly Hills, CA (US) 90210

( * ) Notice: Subject to any disclaimer, the term of this patent is extended or adjusted under 35 U.S.C. 154(b) by 0 days.

This patent is subject to a terminal disclaimer.

(21) Appl. No.: 10/199,134

(22) Filed: Jul. 22, 2002

(65) Prior Publication Data
US 2003/0038214 A1 Feb. 27, 2003

Related U.S. Application Data

(63) Continuation-in-part of application No. 09/643,804, filed on Aug. 22, 2000, now Pat. No. 6,454,212, which is a continuation-in-part of application No. 09/620,812, filed on Jul. 21, 2000, now abandoned.

(51) Int. Cl.$^7$ .............................................. B64D 37/00
(52) U.S. Cl. ................................ 244/135 A; 244/135 B
(58) Field of Search ....................... 244/135 A, 135 B, 244/135 C, 1 TD

(56) References Cited

U.S. PATENT DOCUMENTS 6,604,711 B1 * 8/2003 Stevens et al. ......... 244/135 A

* cited by examiner

Primary Examiner—Teri Pham Luu
Assistant Examiner—Stephen A. Holzen
(74) Attorney, Agent, or Firm—Ira M. Siegel

(57) ABSTRACT

The invention is a variable displacement hydraulic motor-controlled hose reel drive system for aerial refueling of a receiver aircraft from a tanker aircraft. The system includes a variable displacement hydraulic motor, a tachometer/position sensor, a reaction torque sensor and a microprocessor which, depending upon data received from the system's position and reaction torque sensors, sends appropriate signals to the motor. The invention is also a method for deploying a hose and drogue so as to reduce the likelihood that the hose would go into oscillation after initial engagement of a receiver aircraft's probe with the drogue. In an embodiment of the invention, the hose is retracted prior to hook up of the probe and drogue, and the force required to retract the hose is recorded. After initial engagement of the probe with the drogue, the hose is retracted until the force required to retract the hose rises to about the same force previously recorded.

40 Claims, 2 Drawing Sheets

AERIAL REFUELING HOSE REEL DRIVE CONTROLLED BY A VARIABLE DISPLACEMENT HYDRAULIC MOTOR AND METHOD FOR CONTROLLING AERIAL REFUELING HOSE REEL

CONTINUATION IN PART

This Application is a continuation-in-part of application Ser. No. 09/643,804 filed Aug. 22, 2000, now U.S. Pat. No. 6,454,212, which was a continuation in part of now-abandoned application Ser. No. 09/620,812 filed Jul. 21, 2000.

BACKGROUND OF THE INVENTION

1. Field of the Invention

This invention relates to aerial refueling of aircraft from tanker aircraft having a reel-mounted hose and drogue system.

2. Prior Art

Aerial refueling of one aircraft from a flying tanker aircraft has become a fairly common event. One such event was depicted in the recent motion picture entitled "Air Force One." Nevertheless, aerial refueling is still a difficult and dangerous maneuver and is typically attempted only by military pilots in military aircraft.

Today, two types of aerial refueling systems are used by the various militaries throughout the world. One is an extendible boom system and the other is a hose and drogue system. The invention relates to the latter type system.

In a hose and drogue system, the drogue is attached to the outlet end of a hose. The inlet end of the hose is attached to a reel onto which the hose is wound. The reel is typically mounted either within the tanker aircraft's fuselage or on a refueling pod or module which is attached to the bottom of the tanker aircraft. When the hose is deployed, the outlet end of the hose, with its attached drogue, extends behind the tanker aircraft. Depending upon the combinations of tanker and receiver aircraft and the specifications of the particular refueling system used, the length of the hose may be 50 feet or more, and the drogue is in a preferred refueling range when it is extending about 30 feet from the reel.

When the hose and drogue are in the fully extended position (with several turns of hose still remaining on the reel), the pilot of the aircraft to be refueled maneuvers his or her aircraft into a position such that the refueling probe of the receiver aircraft enters into and engages with the drogue. The pilot continues to urge the receiver aircraft forward relative to the tanker aircraft until the drogue is in the refueling range. As the receiver aircraft is moving forward, the hose is retracted onto the reel to take up the slack in the hose. A refueling range marker is disposed on a predetermined portion of the hose. When the pilot of the receiver aircraft sees the refueling range marker reenter the tanker aircraft's fuselage or refueling pod, the receiver aircraft's pilot knows that the drogue, engaged with the receiver aircraft's probe, is in the refueling range. When the engaged drogue and probe are in the refueling range, fuel is pumped from the tanker aircraft to the receiver aircraft. After refueling is completed, the pilot of the receiver aircraft reduces its speed relative to the tanker aircraft. The hose and drogue are pulled back with the probe of the receiver aircraft, with the hose again being unwound from the reel, until the drogue and hose reach the fully extended position. At this point rotation of the reel stops, the drogue and hose cannot be pulled further back, and the receiver aircraft's refueling probe disengages from the drogue. Retraction of the hose back onto the reel then begins.

Danger arises during the initial engagement from the fact that both the tanker and receiver aircraft are not in locked relationship with each other and the hose (at least at its outlet end) and drogue, once deployed from the tanker aircraft, are not in locked relationship with either aircraft until the refueling probe makes engagement with the drogue. With each of the aircraft traveling at hundreds of miles per hour with respect to the surrounding air, there are a significant number of mis-engagements caused by excessive closing speed between the tanker and receiver aircraft. The frequency of mis-engagements increases with darkness of evening and night. Because the drogue is being hit with considerable force and is being displaced back toward the tanker aircraft before the pilot of the receiver aircraft can reduce the speed of the receiver aircraft to match that of the tanker aircraft, a large amount of slack is formed in the hose and the hose bends into a shape resembling a sine wave.

In this condition, the hose often goes into oscillation with the result that the drogue, "whipping" about, may detach the probe from the receiver aircraft, and the drogue, either itself or with the detached probe, may hit the receiver aircraft causing loss of life and/or of the receiver aircraft.

The hose oscillation problem could be minimized if the hose could be retracted quickly so as to reduce the slack in the hose and to minimize the amplitude of any oscillation resulting from the engagement of the refueling probe and the drogue.

The prior art consists of a hose reel drive assembly which uses a fixed displacement hydraulic motor to control the retraction and extension of the refueling hose, as exemplified by the FR 300 hose reel drive assembly offered for sale by Sargent Fletcher, Inc. of El Monte, Calif. This system does not provide sufficiently quick retraction of the hose and drogue after missed engagements or upon high speed engagements so as to significantly reduce the risks arising therefrom. The principal impediment of the FR 300 hose reel drive assembly and similar systems is the limited hydraulic flow available to hydraulic motors on tanker aircraft. In addition, a fixed displacement hydraulic motor requires a complex hydro-mechanical servo mechanism to control the motor, which increases both its weight and response time.

SUMMARY OF THE INVENTION

The invention is a variable displacement hydraulic motor-controlled hose reel drive system for aerial refueling of a receiver aircraft from a tanker aircraft. The system includes a variable displacement hydraulic motor, a tachometer/position sensor, a reaction torque sensor and a microprocessor which, depending upon data received from the system's position and reaction torque sensors, sends appropriate signals to the motor. The invention is a significant improvement over the prior art because the invented system is lighter and more responsive. With respect to the matter of weight, for every pound saved in equipment, another pound of fuel (or some other piece of equipment) may be carried by the tanker aircraft.

The invention is also a method for deploying a hose and drogue so as to reduce the likelihood that the hose would go into oscillation after initial engagement of a receiver aircraft's probe with the drogue. In an embodiment of the invention, the hose is retracted prior to hook up of the probe and drogue, and the force required to retract the hose is recorded. After initial engagement of the probe with the drogue, the hose is retracted until the force required to retract the hose rises to about the same force previously recorded.

The invention may be used with almost any hose reel and any length of hose currently used, and is particularly adaptable to changes in such components because the software of the microprocessor may be easily updated.

DETAILED DESCRIPTION OF THE INVENTION

Figure 1:
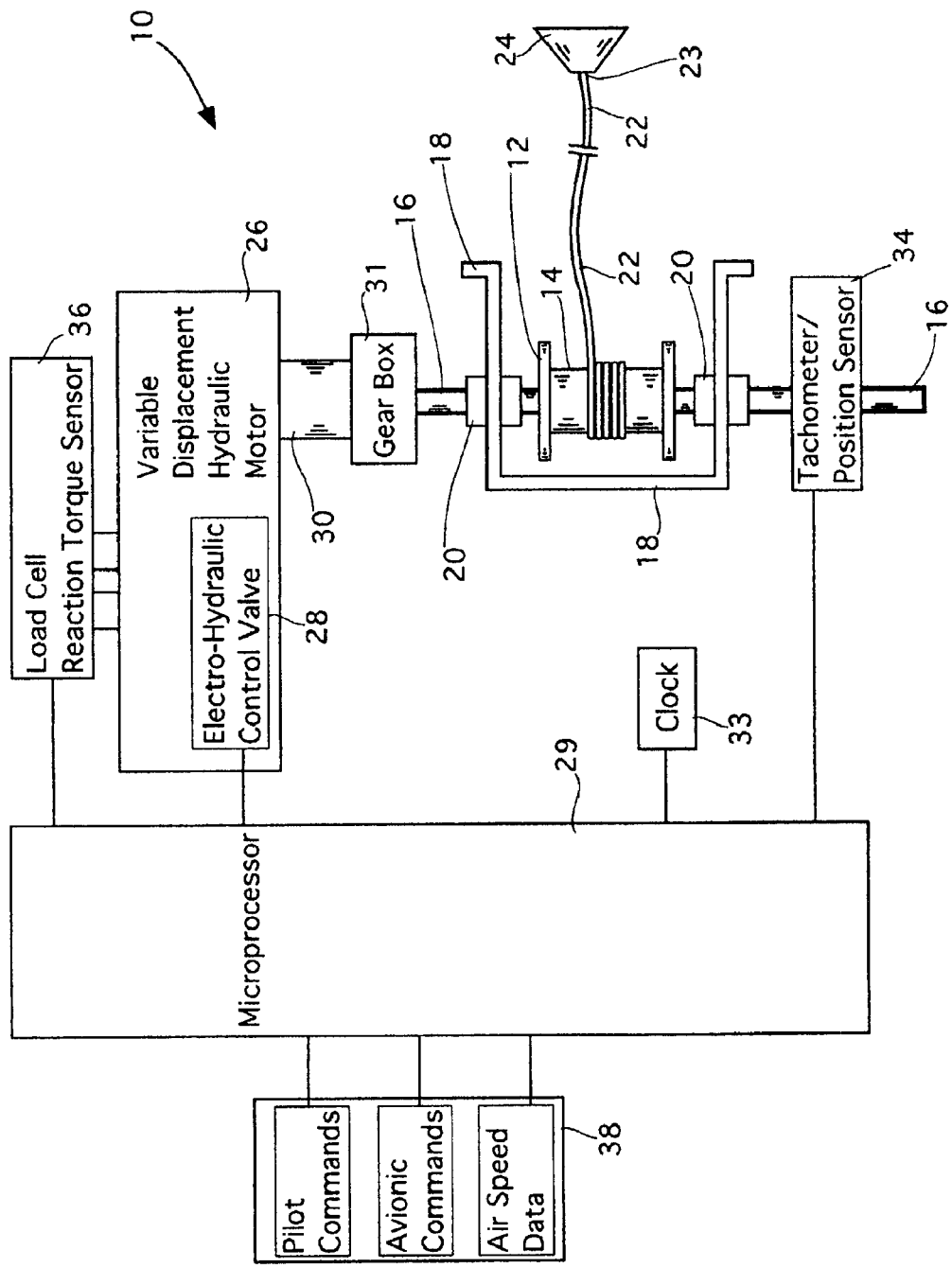
FIG. 1 is a schematic view of the invented hose reel control system.

The preferred embodiment of the invented hose reel drive system 10 is shown in FIG. 1.

A hose reel 12 is shown. It includes drum 14 around which hose 22 is wound. In FIG. 1, the hose is shown in a partially-deployed position. Drogue 24 is attached to the free or outlet end 23 of the hose. The hose reel is mounted on reel drive shaft 16, which is mounted on housing 18 by means of bearing boxes 20. Housing 18 may be affixed to the interior of a tanker aircraft's fuselage or to a refueling pod or module which is attached to the bottom of the tanker aircraft. (In either event, the hose reel is mounted, either directly or indirectly, on the tanker aircraft's fuselage.) The inlet end of the hose is attached to the drum and is connected to the tanker aircraft's refueling supply in any of the ways known to designers of tanker refueling configurations. In fact, the hose reel, drum, hose, drogue, reel drive shaft, housing and bearing boxes may all be configured as is already done in the prior art.

The invented hose reel drive system includes a variable displacement hydraulic motor 26 having an electro-hydraulic control valve 28. The spline shaft 30 of the motor is connected to gear box 31 which in turn is connected to an end of reel drive shaft 16. The gear box connects the spline shaft to the reel drive shaft at a speed reduction ratio of about 50 to 1.

The variable displacement hydraulic motor may be selected from such motors offered for sale by manufacturers of hydraulic motors. Depending upon the specifications relating to the size and weight of the reel drive shaft, reel, hose and drogue, the reduction gear ratio and the speeds at which the reel is to be operated, the sizes of certain parts of the motor may have to be customized. A typical motor manufacturer has the skills required to accomplish such customization.

In a manner known by motor manufacturers, the torque at which the motor drives its spline shaft is controlled by the electro-hydraulic control valve. By way of a summary description, the electro-hydraulic control valve increases or decreases the pressure of hydraulic fluid within a spring-biased displacement control piston in the motor. The hydraulic pressure in the control piston causes that piston to move into a position corresponding to such pressure. The position of the control piston determines the motor displacement, which in turn determines the output torque exerted by the spline shaft at a given hydraulic pressure supplied to the motor. The particular motor displacement and the maximum available hydraulic flow to the motor determine the maximum motor speed (i.e., the output speed of the spline shaft measured in revolutions per minute). The electro-hydraulic control valve is itself controlled by electronic signals. In the invented system, the control valve 28 is electrically connected to microprocessor 29.

Microprocessor 29 is pre-programmed to send appropriate control signals to the control valve depending upon the hose and drogue, the direction and speed of their travel relative to the reel, and forces on them. Microprocessor 29 has an internal clock and/or is connected to an external clock 33. The microprocessor is also electrically connected to the tanker aircraft's cockpit controls 38 so that microprocessor 29 receives flight data such as air speed data and command instructions (e.g., deploy hose and drogue, and retract hose and drogue) initiated by the tanker aircraft's pilot or by avionic equipment.

The microprocessor receives data indicating the position of the hose (i.e., how far the drogue is extended from the reel) and the speed and direction in which the hose is traveling, from tachometer/position sensor 34 which is electrically connected to the microprocessor. In the preferred embodiment the tachometer/position sensor is mechanically connected to reel drive shaft 16. The tachometer/position sensor module may instead be connected to reel 12. It will be appreciated by those skilled in the art that the tachometer/position sensor may simply be a tachometer or a position sensor, with the speed of the reel drive shaft and its angular position being mathematically related to each other as a function of elapsed time. In addition, elapsed time and the reel drive shaft's speed or angular position are mathematically related to the linear speed (e.g., at feet per second) at which the hose and drogue are being extended or retracted and their instant position, depending upon the particular geometry (e.g., drum and hose diameters) of the reel and hose.

The microprocessor receives data relating to the reaction torque on the reel (i.e., as a result of contact of the receiving aircraft's refueling probe with the drogue and/or air stream effects) from reaction torque sensor 36, which in the preferred embodiment is a load cell, which is electrically connected to the microprocessor. In a preferred embodiment the reaction torque sensor is mounted between the variable displacement hydraulic motor and the fuselage or pod. (Since the pod is mounted on the fuselage, the pod may be viewed as part of the fuselage.)

The electrical outputs of the reaction torque sensor and tachometer/position sensor are preferably converted to digital form for the microprocessor.

The microprocessor is preprogrammed with software so that it sends signals to the electro-hydraulic control valve to operate the variable displacement motor typically as follows:

When the hose and drogue are in the stowed position (i.e., hose 22 is completely wound on reel drum 14) and the tanker aircraft's pilot has not yet deployed the hose and drogue, the microprocessor sends a "neutral" signal to electro-hydraulic control valve 28. The control valve in turn controls the hydraulic pressure so that the motor displacement is zero (i.e., spline shaft may rotate freely). When the hose and drogue are intended to be in the stowed position, a brake mounted on the housing engages the reel to prevent its rotation. In addition, a spring mounted on the housing engages the drogue. (Neither the brake nor the spring are shown in FIG. 1.)

When the pilot (or avionic equipment) issues a deploy command, the brake is released and the spring ejects the drogue and attached portion of the hose out of the tanker aircraft's fuselage or refueling pod and into the air stream. The reel, in response to the torque imposed on it by the spring through the drogue and hose, rotates in the hose extension direction. The microprocessor continues to send the neutral signal to control valve 28 until the microprocessor receives data from tachometer/position sensor 34 indicating that a first predetermined length of hose has unwound from reel 12. The microprocessor may be referred to as being in the "initial trail" mode between the issuance of the deploy command and the first predetermined length of hose being unwound. In typical applications, the first predetermined length will be 3 feet, and that number will be used in this description to exemplify the first predetermined length.

When the microprocessor receives data from the tachometer/position sensor indicating that more than 3 feet of hose has unwound from the reel, microprocessor 29 goes into "hose extend" mode and sends signals to the electro-hydraulic control valve which effectively cause the variable displacement hydraulic motor to act as a pump. The drogue, now out of the tanker aircraft's fuselage or refueling pod, is subject to a rearward (i.e., relative to the direction in which the tanker aircraft is traveling) pulling force exerted by the air stream. The reel, in response to the torque imposed on it by the air stream through the drogue and hose, continues to rotate in the hose extension direction. The microprocessor signals the control valve to provide sufficient hydraulic pressure to set the motor's displacement for motor 26 (here acting as a pump) to provide resistance preventing the hose from unwinding from the reel at a linear speed above a first predetermined extension speed, which may also be referred to as the nominal hose extension speed. In typical applications the nominal hose extension speed is about 10 feet per second, and that number will be used in this description to exemplify the first predetermined extension speed. If tachometer/position sensor 34 sends data to microprocessor 29 indicating that the hose extension speed exceeds 10 feet per second, the microprocessor signals the control valve to increase hydraulic pressure and the motor's displacement, thereby increasing the resistance torque supplied by the motor (acting as a pump), until tachometer/position sensor 34 indicates that the hose extension speed drops below 10 feet per second. If tachometer/position sensor 34 sends data to microprocessor 29 indicating that the hose extension speed is below 50% of the nominal hose extension speed (below 5 feet per second in the example discussed here), the microprocessor signals the control valve to decrease hydraulic pressure, thereby decreasing motor's displacement and the resistance supplied by the motor (pump), until the tachometer/position sensor 34 indicates that the hose extension speed reaches 10 feet per second. So long as the hose extension speed during the hose extend mode is about 10 feet per second, microprocessor 29 signals the control valve to maintain the current hydraulic pressure and motor displacement.

Microprocessor 29 continues to monitor the hose length data (i.e., data relating to the length of hose unwound from the reel) and, as the hose length approaches a second predetermined length (discussed further in the paragraph below), the microprocessor sends signals to the control valve which cause the valve to increase the hydraulic pressure, thereby increasing the motor's displacement and the resistance torque developed by the motor, until the hose extension speed approaches zero.

When the microprocessor receives data from tachometer/position sensor 34 indicating that the second predetermined length of hose (including the first predetermined length) has unwound from reel 12, the microprocessor signals the control valve to increase the hydraulic pressure to a level which sets the motor's displacement such that the motor exerts sufficient torque, through spline shaft 30 and gear box 31, on reel drive shaft 16 to completely resist the force imparted by the air stream on the drogue and hose and bring the rotation of reel 12 to a halt (with several turns of hose still remaining on the reel). The microprocessor may be referred to as being in the "full trail" mode. The second predetermined length will vary widely depending mostly on the type of tanker aircraft on which the refueling system is mounted. For purpose of illustration, 50 feet will be used to exemplify the second predetermined length. While in the full trail mode, microprocessor 29 signals the control valve to maintain the hydraulic pressure such that the resistance torque maintains the extended hose length at 50 feet.

At the time that the hose length has been maintained at 50 feet (i.e., the hose speed equals zero (0) feet per second) for 5 seconds, the microprocessor goes into "pre-engagement" mode. The microprocessor continues, in response to data received from the tachometer/position sensor, to send signals to the control valve to maintain the hose extension at 50 feet. Reaction torque sensor 36 measures the reaction torque on the reel and reel drive shaft exerted by the air stream pulling on the drogue and hose. The reaction torque sensor sends data representing that force to the microprocessor, which stores the data in its memory. The amplitude of that torque may be referred to as the "free trail drag torque." The microprocessor also stores in its memory the air speed data received from the cockpit controls.

Because the actual force imposed on the drogue by the air stream is mathematically related to the air speed of the tanker aircraft and therefore the actual force imposed on the drogue by the air stream will change if the air speed of the tanker aircraft changes from the time that the free trail drag torque was first determined, microprocessor 29 continuously receives instant air speed data, compares it to the stored air speed data, and recalculates the free trail drag torque.

Microprocessor 29 also continues to receive data representing the reaction torque and compares the instant reaction torque to the recalculated free trail drag torque.

At this point in time, a "begin engagement" signal is transmitted to the pilot of the receiver aircraft, and that pilot begins his or her aircraft's run at the drogue.

If the receiver aircraft's probe successfully engages the drogue, microprocessor 29 goes into the "engagement" mode. The microprocessor continues to monitor the reaction torque data from reaction torque sensor 36, which now is measuring the reaction torque on reel 12 and reel drive shaft 16 as a result of the net force resulting from the force exerted by the air stream pulling on the drogue plus or minus (depending upon whether the receiver aircraft is moving slower or faster than the tanker aircraft) the force exerted on the drogue by the refueling probe. The amplitude of this reaction torque may be referred to as "net drag torque." Because the receiver aircraft must be traveling at a speed somewhat faster than the tanker aircraft's speed to achieve engagement of the fuel probe with the drogue, the net drag torque will be less than the free trail drag torque during the initial engagement of the probe with the drogue. During initial engagement it is desirable to have the refueling probe exert significant force against the drogue so as to assure proper engagement of the probe and drogue. Therefore, during initial engagement it is concomitantly undesirable to have the motor 26 cause retraction of the hose and drogue. So, in response to data from reaction torque sensor 36 regarding the net drag torque, microprocessor 29 signals the control valve to decrease the hydraulic pressure to decrease the motor's displacement, and therefore the motor's torque output at spline shaft 30 so as to keep the hose speed at zero as the receiver aircraft pushes the drogue forward.

However, if the net drag torque drops by more than a first predetermined torque difference below the free trail drag torque (i.e., below a first predetermined percentage of the free trail drag torque), a dangerous amount of slack may form in the extended hose. In typical applications, the danger may arise when the net drag torque drops to 80% or less of the free trail drag torque, and for purposes of the example discussed herein, the first predetermined torque difference is equal to 20% of the free trail drag torque and the first predetermined percentage of the free trail drag torque is 80%). Of course, the first predetermined torque difference may be different for various combinations of tanker and receive aircraft and particular hoses and drogues. Also, once the first predetermined torque difference is reached, secure engagement of the probe and hose is reasonably assured.

Microprocessor 29 compares the instant net drag torque to the free trail drag torque. Once the net drag torque is less than the first predetermined percentage of the free trail drag torque (i.e., more than the first predetermined torque difference (in this example an amount equal to 20% of the free trail drag torque) below the free trail drag torque), microprocessor 29 determines the signals to be sent to the control valve so that the variable displacement hydraulic motor 26 acts as a motor, with its displacement set at the greater of, A. a displacement corresponding to a motor torque output which equals the net drag torque multiplied by 1.1; and B. a displacement corresponding to the maximum allowable motor speed at the maximum available hydraulic flow to the motor.

The maximum allowable motor speed depends upon the maximum allowable hose speed. In typical applications, the maximum allowable hose speed is 20 linear feet per second, and that figure will be used in the example described herein. The microprocessor sends such signals to the control valve so as to cause the reel to rotate in the hose retraction direction until the net drag torque returns to 80% of the free tail drag torque. Until the net drag torque returns to 80% of the free trail drag torque, the motor causes the reel to retract the hose at up to 20 feet per second.

Then microprocessor 29 enters the "refueling" mode. The microprocessor determines the signals it needs to send to the control valve to set the motor's displacement so that the motor's output torque is sufficient to hold the hose speed at zero so long as the net drag torque is between the first predetermined percentage of the free trail drag force (80% in this example) and a second predetermined percentage of the free trail drag force (90% in this example) of the free trail drag torque, and sends such signals to the control valve. The variable displacement hydraulic motor will be instructed to act either as a motor (providing driving torque), causing the reel to retract the hose at a speed up to 20 feet per second, if the net drag torque falls below 80% of the free trail drag torque, or as a pump (providing resistance torque), allowing the reel to extend the hose at a speed up to 20 feet per second, if the net drag torque rises above 90% of the free trail drag torque. At this time the receiver aircraft's pilot will be adjusting the speed of the receiver aircraft relative to the speed of the tanker craft so that the distance between the two aircraft will be such that the hose extension is at a third predetermined length, signaled to the microprocessor by the tachometer/position sensor and to the receiver aircraft's pilot by the refueling range marker's appearing adjacent the tanker aircraft's fuselage or refueling pod.

When the hose extension hits the third predetermined length while microprocessor is in the refueling mode, refueling (i.e., pumping of fuel from the tanker aircraft to the receive aircraft) will begin, the microprocessor will continue to determine the signals it needs to send to the control valve to hold the hose speed at zero so long as the net drag torque is between 80% and 90% of the free trail drag torque, and sends such signals to the control valve. The receiver aircraft's pilot will attempt to maintain the speed of the receiver aircraft the same as the speed of the tanker aircraft. To the extent if any that the two aircraft's speeds vary from each other such that the net drag torque is outside the 80–90% of free trail torque range, microprocessor instructions will result in the motor acting as a motor or pump, retracting or allowing extension of the hose at up to the maximum allowable hose speed as described in the paragraph immediately above. While the microprocessor is in the refueling mode, actual refueling will stop if the hose length changes by more than a predetermined marginal amount from the third predetermined length and will restart when the hose length returns to within the predetermined marginal amount of the third predetermined length.

When refueling is complete, the receiver aircraft's pilot reduces the speed of the receiver aircraft relative to the tanker aircraft. The microprocessor remains in the refueling mode and, since the net drag torque will exceed 90% of the free trail drag force, the microprocessor will be sending signals to the control valve which cause the motor's displacement to be set such that the motor acts as a pump. The microprocessor stays in the refueling mode until it receives hose length data indicating that the hose length is approaching the second predetermined length (50 feet in the example discussed herein).

Then the microprocessor sends signals to the control valve which cause the valve to increase the hydraulic pressure, thereby increasing the resistance torque, until the hose extension speed approaches zero. When the microprocessor receives data from tachometer/position sensor 34 indicating that the second predetermined length of hose has unwound from reel 12, the microprocessor signals the control valve to increase the hydraulic pressure and the motor's displacement to a level which causes the motor to exert sufficient torque, through spline shaft 30 and gear box 31, on reel drive shaft 16 to completely resist the force imparted by the air stream and the probe on the drogue, and bring the rotation of reel 12 to a halt (with, as discussed above, several turns of hose still remaining on the reel). By the time that the reel is brought to a halt, the probe has disengaged from the drogue.

The microprocessor, still monitors the hose length and reaction torque data, and, depending upon a tanker aircraft cockpit command, either (i) returns to the beginning of the full trail mode to start the refueling process for another receiver aircraft or (ii) enters the "retraction" mode and issues signals to the control valve which result in the motor outputting sufficient torque to cause the hose to be wound upon the reel at up to a second predetermined retraction speed, which in this example is 10 linear feet per second. When the microprocessor receives hose length data indicating that the hose length is approaching the first predetermined length (3 feet in the example discussed herein), the microprocessor sends signals to the control valve which cause the valve to decrease the hydraulic pressure, which decreases the motor's displacement, thereby resulting in a decrease in the hose retraction speed. The microprocessor continues sending signals causing retraction of the hose until the drogue contacts and compresses the ejection spring and the hose length data indicates that hose extension length is zero, with the motor's displacement set at zero.

The brake is engaged with the reel and the microprocessor returns to the neutral mode.

The speed at which adjustments from one hose speed to another are made are, of course, is limited by the acceleration capabilities the particular variable displacement hydraulic motor chosen by a designer assembling the invented system. As a result, it will be recognized that the hose may be put into its desired extension length before a particular target hose speed is actually reached.

In prior art systems, drogues and hoses have been deployed only to be incapable of being retracted as a result of a breakdown in the hose deployment system. In a preferred embodiment of the invention, the microprocessor is programmed so that it goes into a "test" mode the first time that the hose reaches the second predetermined length after the microprocessor is in the initial trail mode. That is, microprocessor 29 determines the signals to be sent to the control valve so that variable displacement hydraulic motor 26 acts as a motor, with its displacement set to retract the hose at up to the maximum allowable hose speed. Such signals are sent by the microprocessor to the control valve until the microprocessor receives hose length data indicating that the hose length is approaching a fourth predetermined length, which is greater than the first predetermined length and less than the second predetermined length. The fourth predetermined length may be the same as the third predetermined length. After the tachometer/position sensor detects that the hose length has approached the fourth predetermined length, the microprocessor. then sends signals to the control valve which cause the valve to decrease the hydraulic pressure, which decreases the motor's displacement, thereby resulting in a decrease in the hose retraction speed, until the speed reaches zero. At this point the microprocessor determines that the hose deployment system is functioning properly and goes back into the hose extend mode, with hose extension and retraction being performed as described above. Unless the microprocessor has determined that the hose deployment system is functioning properly, no begin engagement signal is sent to the receiver aircraft.

The invented system requires less hydraulic fluid flow than prior art systems and provides quicker responses to aerial refueling events than prior art systems because the invented system uses a variable displacement hydraulic motor rather than a fixed displacement hydraulic motor. The invented system also provides quicker and more relevant responses to aerial refueling events because the variable displacement hydraulic motor is itself controlled by a microprocessor which reacts to instant data. The invented system is also more adaptable to changes in reel, hose, drogue and aircraft configurations because most adaptations may be appropriately made by mere software upgrades of the microprocessor's software.

In addition, the invention is a method for controlling the hose reel drive as described above.

The method described above works well at higher refueling air speeds because the force imparted by the air stream on the drogue and hose (i.e., air stream drag) is substantially higher than the forces attributable to friction imposed directly or indirectly on the hose. At such speeds, the forces attributable to friction may be ignored.

Friction arises between the shaft and the bearing boxes, the portion of the hose unwinding from (or winding onto) the drum and the portion of the hose remaining on (or already on) the drum, and other places as well. While the force attributable to air stream drag will always pull away from the tanker, the forces attributable to friction will always act in the direction opposite to the direction that the hose is moving (i.e., friction will act to resist the extension of the hose and, when the hose is being retracted, both the air stream drag and friction must be overcome to retract the hose).

Another place that friction arises is between the hose and a stowage tube which many hose reel drive systems include. Such a tube is mounted on the tanker aircraft's fuselage or the refueling pod or module, or it is mounted on the hose reel's housing.

The air stream drag force decreases when the air speed of the tanker decreases. Therefore, the ratio of air stream drag force to friction is much lower when refueling occurs at lower air speeds because air stream drag is much lower at lower air speeds. In addition, force on the hose attributable to friction increases as air speed decreases. This is particularly so for systems having stowage tubes because the pitch, or angle of attack, of the tanker is higher at lower air speeds than it is at higher air speeds, which causes increased friction between the tube and the hose.

For engaging the probe with the drogue at lower air speeds, the forces attributable to friction should be taken into account to reduce the likelihood that the hose will go into oscillation.

The embodiment of the invention described below provides for safe probe and drogue engagement over a wide range of air speeds.

Figure 2:
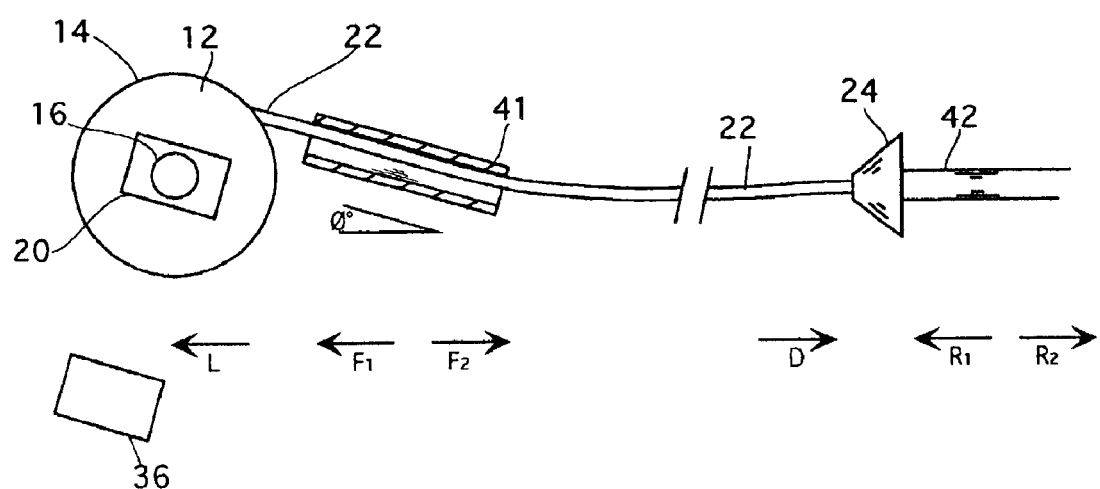
FIG. 2 is a schematic view, from the side, of a portion of the invented hose reel system indicating some of the forces acting on the hose.

FIG. 2 is a schematic view, from the side, of a portion of the invented hose reel system indicating some of the forces acting on the hose. Shown in this figure are drum 14, shaft 16, one of the bearing boxes 20 through which the shaft is mounted to the housing (not shown in FIG. 2), hose 22, drogue 24, reaction torque sensor 36, hose extension tube 41 (shown in cross section) and probe 42 of the receiver aircraft. The reaction torque sensor 36, preferably a load cell, may be disposed in several different places, including between the fuselage or pod and the motor which drives the shaft or between the shaft and a bearing box.

In FIG. 2 the tanker is depicted as having a pitch or angle of attack of Ø° from horizontal. As indicated above, as Ø increases, forces attributable to friction increase.

The load sensed by the reaction torque sensor may be described by the following equations (which themselves are an approximation):

$$L+F_1+R_1=D+F_2+R_2$$

$$L=D-F_1+F_2-R_1+R_2$$

where L is the load sensed by the reaction torque sensor, D is the force attributable to air stream drag which tends to pull the drogue and hose away from the tanker, $F_1$ is the force attributable to friction when the hose is being extended or being urged to unwind from the reel (i.e., the force attributable to friction resists the pulling of the drogue and hose away from the tanker and acts in the opposite direction to D), $F_2$ is the force attributable to friction when the hose is being retracted or being urged to wind on to the reel (i.e., the force attributable to friction resists retraction of the hose into the tanker and acts in the same direction as D), $R_1$ is the force exerted by the receiver aircraft, through its probe, on the drogue when the receiver aircraft is pushing the drogue and $R_2$ is the force exerted by the receiver aircraft, through its probe, on the drogue when the receiver aircraft is pulling the drogue.

In the discussion above when friction was not taken into account (i.e., for the higher air speed refueling circumstances both $F_1$ and $F_2$ are de minimus compared to D and may be ignored) the free trail drag torque (sometimes referred to herein as the free trail drag force) is equal to D. It was explained that upon the initial engagement of the probe with the drogue, if the net drag torque (sometimes referred to herein as the net drag force) sensed by the reaction torque sensor dropped below a first predetermined percentage (e.g., 80%) of the free trail drag force, the shaft should be made to rotate so as retract the hose so that the net drag force sensed by the reaction torque sensor is brought back up to at least the first predetermined percentage of the free trail drag force. Then in the refueling mode the hose is extended or retracted so that the net drag force remains at least as great as the first predetermined percentage of the free trail drag force and not greater than a second predetermined percentage of the free trail drag force.

When the hose and drogue are extended to the second predetermined length, the reaction torque sensor senses the free trail drag force. Because $F_2$, $R_1$ and $R_2$ are all zero at that time (since the hose is not being retracted or urged to retract and the probe is not in contact with the drogue), $$L' \text{ (the free trail drag force)}=D-F_1.$$

When the receiver aircraft's probe first engages the drogue, the engagement mode begins, and the hose starts to be retracted, the load sensed by the reaction torque sensor may be described by the following equation:

$$L_r \text{ (net drag force during retraction)}=D+F_2-R_1,$$

because $F_1$ is zero (since the hose is being retracted and not being extended) and $R_2$ is zero. However, the target net drag force, as described for the higher speed circumstances, is the first predetermined percentage of $L'$. If either or both of $F_1$ and $F_2$ are substantial, hose retraction will stop almost immediately, even if the first predetermined percentage is slightly greater than 100%.

By way of example, if D equals 300 lbs., $F_1$ equals 75 lbs, $F_2$ equals 75 lbs. and $R_1$ on initial contact with the drogue is 300 lbs., the reaction torque sensor would sense a very low load until the reel begins to rotate in the direction to retract the hose. However, at this time the receiver aircraft's speed relative to the drogue is slowed quickly, so $R_1$ drops very quickly to 100 lbs. or less. Therefore $L_r$ would rise very quickly to at least 275 lbs. (i.e., 300+75−100), which is greater than $L'$ (i.e., 300−75=225 lbs.). As a result, the hose retraction would be stopped very quickly, with a substantial amount of slack still left in the hose.

With retraction stopping almost immediately, the refueling hook up operation would be subject to almost the same risk of having a large amount of slack being formed in the hose with dangerous oscillations resulting as if no retraction had occurred.

Therefore, at least at lower air speeds, the forces attributable to friction should be taken into account in determining when to stop the reel from rotating in the hose retraction direction when hose retraction has begun in response to initial engagement of the probe with the drogue. To do so, both F1 and F2 should be added to the free trail drag force to calculate an adjusted free trail drag force. However, the load sensed by the reaction torque sensor when the hose and drogue are retracted without the probe in contact with the drogue would equal $L'$ with both $F_1$ and $F_2$ added to it. That is, when the hose is retracted without the probe in contact with it, the reaction torque sensor would measure the free retraction drag force ($L_{fr}$). Since $$L'=D-F_1,$$

therefore $$D=L'+F_1.$$

Since $$L_{fr}=D+F_2,$$

and $$D=L'+F_1,$$

it follows that $$L_{fr}=L'+F_1+F_2.$$

In the preferred version of this embodiment, $L_{fr}$ is measured while the hose is retracted at a substantially constant hose speed.

So, in an embodiment of the invention which would provide safe refueling over a greater range of air speeds, the first time that the reel is caused to rotate in the hose retraction direction after initial engagement of the drogue and probe, the rotation of reel in that direction should not be stopped until the net drag force has risen to at least the free retraction drag force multiplied by a factor of K (i.e., until the net drag force is at least equal to $KL_{fr}$), where K is a predetermined value between approximately 0.2 and approximately 2. In the preferred version of this embodiment, K is approximately 1. K may be different for each tanker aircraft/reel-mounted hose and drogue system combination and may be determined empirically, such as in the course of practice exercises.

After rotation of the reel is stopped upon the net drag force reaching at least $KL_{fr}$, the refueling mode is entered, and the invented system performs, and the invented method is performed, as described above.

In the preferred version of this embodiment, the free retraction drag force may be measured when the microprocessor is in the test mode. That is, the free retraction drag force may be measured while the hose is being retracted from the second predetermined length to the fourth predetermined length. However, the free retraction drag force can be measured and provided (either initially or as an update) to the microprocessor whenever the hose and drogue (without a probe in contact therewith) are being retracted (preferably at a substantially constant hose speed). And this usually may be done whenever the hose length is greater than the first predetermined length. In addition, the microprocessor may recalculate the free retraction drag force in view of air speed data and would compare instant reaction torque with K multiplied by the recalculated free retraction drag force to determine when to stop the rotation of reel in the retraction direction after initial engagement of the probe and drogue.

It will be understood that various changes of the details, materials, steps, arrangement of parts and uses which have been herein described and illustrated in order to explain the nature of the invention will occur to and may be made by those skilled in the art, and such changes are intended to be included within the scope of this invention.

I claim the following:

1. A method for deploying a hose and drogue for aerial refueling of a receiver aircraft from a tanker aircraft, wherein said tanker aircraft includes a refueling system having a hose reel, with the hose wound around the reel, mounted on the tanker aircraft's fuselage such that said reel may rotate in a hose extension direction or in a hose retraction direction, said hose having an outlet end with said drogue affixed to said outlet end, said method comprising the following steps:

(a) connecting the hose reel to a variable displacement hydraulic motor's output shaft, said motor having an electro-hydraulic control valve which controls said motor's displacement, the displacement of said motor being approximately zero when said hose and drogue are stowed in the tanker aircraft's fuselage;

(b) upon receipt of a deploy command, maintaining said motor's displacement at approximately zero and ejecting the drogue from said fuselage into an air stream and allowing said air stream to pull said drogue so that the hose unwinds from said hose reel and the hose reel rotates in the hose extension direction;

(c) sensing the hose's speed;

(d) sensing the hose's length which is unwound from said hose reel;

(e) while said hose length is beyond a first predetermined length, and while the drogue is not in contact with a probe of said receiver aircraft, setting said motor's displacement so that it causes said hose reel to rotate in the hose retraction direction with the hose winding on said reel and sensing reaction torque on the hose reel (said reaction torque on said hose reel when said hose is being retracted, without the drogue being in contact with said probe, being referred to as "free retraction drag force");

(f) after sensing said free retraction drag force, setting said motor's displacement so that said motor allows the hose reel to continue to rotate in the hose extension direction with the hose unwinding from said reel at a speed up to a first predetermined hose extension speed;

(g) when said hose length approaches a second predetermined length, setting said motor's displacement so that the hose extension speed approaches zero;

(h) when said hose length reaches said second predetermined length, setting said motor's displacement so that the motor maintains said hose speed at zero;

(i) waiting a predetermined time period after said hose speed is zero when said hose length is said second predetermined length and then sensing the reaction torque on the hose reel (said reaction torque on said hose reel when said hose speed is zero at said second predetermined length being referred to as "free trail drag force");

(j) continuing to sense said reaction torque after said receiver aircraft's probe engages said drogue (said reaction torque after said receiver aircraft's probe engages said drogue being referred to as "net drag force");

(k) comparing said net drag force to said free trail drag force, and continuing to set said motor's displacement so that the motor continues to maintain said hose speed at zero until said net drag force is less than a first predetermined percentage of said free trail drag force;

(l) when said net drag force is less than said first predetermined percentage of said free trail drag force, setting said motor's displacement so that it causes said hose reel to rotate in the hose retraction direction with the hose winding on said reel at up to a predetermined maximum allowable hose speed;

(m) continuing to set said motor's displacement so that it causes said hose reel to rotate in the hose retraction direction with the hose winding on said reel at up to said predetermined maximum allowable hose speed until said net drag force has increased to at least as great as said free retraction drag force multiplied by a factor of K, where K is a predetermined value between approximately 0.2 and approximately 2; and (n) after said net drag force has increased to at least as great as K multiplied by the free retraction drag force, setting said motor's displacement so that the motor
  (i) maintains said hose speed at zero so long as said net drag force is at least as great as said first predetermined percentage of said free trail drag force and no greater than a second predetermined percentage of said free trail drag force;
  (ii) causes said hose reel to rotate in the hose retraction direction with the hose winding on said reel at up to said predetermined maximum allowable hose speed when said net drag force drops below said first predetermined percentage of said free trail drag force;
  (iii) allows said hose reel to rotate in the hose extension direction with the hose unwinding from said reel at up to said predetermined maximum allowable hose speed when said net drag force exceeds said second predetermined percentage of said free trail drag force;
until said hose is maneuvered to a third predetermined length, which is less than the second predetermined length and greater than the first predetermined length, at which time said drogue and hose are in a refueling mode position.

2. The method of claim 1, including the following: additional steps:
  (o) when said drogue and hose are in said refueling mode position, setting said motor's displacement so that the motor
    (i) maintains said hose speed at zero so long as said net drag force is at least as great as said first predetermined percentage of said free trail drag force and no greater than said second predetermined percentage of said free trail drag force;
    (ii) causes said hose reel to rotate in the hose retraction direction with the hose winding on said reel at up to said predetermined maximum allowable hose speed when said net drag force drops below said first predetermined percentage of said free trail drag force;
    (iii) allows said hose reel to rotate in the hose extension direction with the hose unwinding from said reel at up to said predetermined maximum allowable hose speed when said net drag force exceeds said second predetermined percentage of said free trail drag force;
  until said hose is maneuvered to said second predetermined length; and
  (p) after said hose is maneuvered to said second predetermined length after having been in said refueling mode position, setting said motor's displacement so that the motor causes the hose speed to be reduced to zero.

3. The method of claim 2, including the following additional steps:
  (q) upon receipt of a retraction command, setting said motor's displacement so that the motor causes said hose reel to rotate in the hose retraction direction with the hose winding on said reel at a second predetermined retraction speed;
  (r) after receipt of said retraction command and after sensing that said hose length has returned to said first predetermined length, setting the motor's displacement so that the motor causes said hose reel to rotate in the hose retraction direction at a rate which reduces the speed at which said hose retracts; and (s) setting said motor's displacement to zero when said hose length is zero.

4. The method of claim 1, including the following additional steps:
   A. monitoring said tanker aircraft's air speed;
   B. comparing said tanker aircraft's instant air speed to what was said tanker aircraft's air speed when said free trail drag force was sensed; and
   C. calculating a new free trail drag force based on a change, if any, in said tanker aircraft's air speed.

5. The method of claim 1, including the following additional steps:
   A. monitoring said tanker aircraft's air speed;
   B. comparing said tanker aircraft's instant air speed to what was said tanker aircraft's air speed when said free retraction drag force was sensed; and
   C. calculating a new free retraction drag force based on a change, if any, in said tanker aircraft's air speed.

6. The method of claim 1, wherein in step (e) said free retraction drag force is sensed when said motor's displacement is set so that it causes said hose reel to rotate in the hose retraction direction with the hose winding on said reel at a substantially constant hose speed.

7. A method for deploying a hose and drogue for aerial refueling of a receiver aircraft from a tanker aircraft, wherein said tanker aircraft includes a refueling system having a hose reel, with the hose wound around the reel such that said reel may rotate in a hose extension direction or in a hose retraction direction, said hose having an outlet end with said drogue affixed to said outlet end, said method comprising the following steps:
   (a) connecting the hose reel to a variable displacement hydraulic motor's output shaft, said motor's displacement being approximately zero when said hose and drogue are stowed in the tanker aircraft;
   (b) upon receipt of a deploy command, maintaining said motor's displacement at approximately zero and ejecting the drogue from said tanker aircraft into an air stream and allowing said air stream to pull said drogue so that the hose unwinds from said hose reel and the hose reel rotates in the hose extension direction;
   (c) sensing the hose's speed;
   (d) sensing the hose's length which is unwound from said hose reel;
   (e) while said hose length is beyond a first predetermined length, and while the drogue is not in contact with a probe of said receiver aircraft, setting said motor's displacement so that it causes said hose reel to rotate in the hose retraction direction with the hose winding on said reel at a substantially constant hose speed and sensing reaction torque on the hose reel (said reaction torque on said hose reel when said hose is being retracted at said substantially constant hose speed, without the drogue being in contact with said probe, being referred to as "free retraction drag force");
   (f) after sensing said free retraction drag force, setting said motor's displacement so that said motor allows the hose reel to continue to rotate in the hose extension direction with the hose unwinding from said reel;
   (g) when said hose length approaches a second predetermined length, setting said motor's displacement so that the hose extension speed approaches zero;
   (h) when said hose length reaches said second predetermined length, setting said motor's displacement so that the motor maintains said hose speed at zero;
   (i) waiting a predetermined time period after said hose speed is zero when said hose length is said second predetermined length and then sensing the reaction torque on the hose reel (said reaction torque on said hose reel when said hose speed is zero at said second predetermined length being referred to as "free trail drag force");
   (j) continuing to sense said reaction torque after said receiver aircraft's probe engages said drogue (said reaction torque after said receiver aircraft's probe engages said drogue being referred to as "net drag force");
   (k) comparing said net drag force to said free trail drag force, and continuing to set said motor's displacement so that the motor continues to maintain said hose speed at zero until said net drag force is less than a first predetermined percentage of said free trail drag force;
   (l) when said net drag force is less than said first predetermined percentage of said free trail drag force, setting said motor's displacement so that it causes said hose reel to rotate in the hose retraction direction with the hose winding on said reel at up to a predetermined maximum allowable hose speed;
   (m) continuing to set said motor's displacement so that it causes said hose reel to rotate in the hose retraction direction with the hose winding on said reel at up to said predetermined maximum allowable hose speed until said net drag force has increased to at least as great as said free retraction drag force multiplied by a factor of K, where K is a predetermined value between approximately 0.2 and approximately 2; and
   (n) after said net drag force has increased to at least as great as K multiplied by the free retraction drag force, setting said motor's displacement so that the motor
      (i) maintains said hose speed at zero so long as said net drag force is at least as great as said first predetermined percentage of said free trail drag force and no greater than a second predetermined percentage of said free trail drag force;
      (ii) causes said hose reel to rotate in the hose retraction direction with the hose winding on said reel at up to said predetermined maximum allowable hose speed when said net drag force drops below said first predetermined percentage of said free trail drag force;
      (iii) allows said hose reel to rotate in the hose extension direction with the hose unwinding from said reel at up to said predetermined maximum allowable hose speed when said net drag force exceeds said second predetermined percentage of said free trail drag force;
   until said hose is maneuvered to a third predetermined length, which is less than the second predetermined length and greater than the first predetermined length, at which time said drogue and hose are in a refueling mode position.

8. The method of claim 7, including the following additional steps:
   (o) after said drogue and hose are in said refueling mode position, setting said motor's displacement so that the motor
      (i) maintains said hose speed at zero so long as said net drag force is at least as great as said first predetermined percentage of said free trail drag force and no greater than said second predetermined percentage of said free trail drag force;

(ii) causes said hose reel to rotate in the hose retraction direction with the hose winding on said reel at up to said predetermined maximum allowable hose speed when said net drag force drops below said first predetermined percentage of said free trail drag force;

(iii) allows said hose reel to rotate in the hose extension direction with the hose unwinding from said reel at up to said predetermined maximum allowable hose speed when said net drag force exceeds said second predetermined percentage of said free trail drag force;

until said hose is maneuvered to said second predetermined length; and (p) after said hose is maneuvered to said second predetermined length after having been in said refueling mode position, setting said motor's displacement so that the motor causes the hose speed to be reduced to zero.

9. The method of claim 8, including the following additional steps:

(q) upon receipt of a retraction command, setting said motor's displacement so that the motor causes said hose reel to rotate in the hose retraction direction with the hose winding on said reel;

(r) after receipt of said retraction command and after sensing that said hose length has returned to said first predetermined length, setting the motor's displacement so that the motor causes said hose reel to rotate in the hose retraction direction at a rate which reduces the speed at which said hose retracts; and (s) setting said motor's displacement to zero when said hose length is zero.

10. The method of claim 7, including the following additional steps:

A. monitoring said tanker aircraft's air speed;

B. comparing said tanker aircraft's instant air speed to what was said tanker aircraft's air speed when said free trail drag force was sensed; and C. calculating a new free trail drag force based on a change, if any, in said tanker aircraft's air speed.

11. The method of claim 7, including the following additional steps:

A. monitoring said tanker aircraft's air speed;

B. comparing said tanker aircraft's instant air speed to what was said tanker aircraft's air speed when said free retraction drag force was sensed; and C. calculating a new free retraction drag force based on a change, if any, in said tanker aircraft's air speed.

12. A method for controlling the deployment of a hose and drogue during aerial refueling of a receiver aircraft from a tanker aircraft, wherein said tanker aircraft includes a refueling system having a hose reel, with the hose wound around the reel such that said reel may rotate in a hose extension direction or in a hose retraction direction, said hose having an outlet end with said drogue affixed to said outlet end, said method comprising the following steps:

(a) after a predetermined length of hose has unwound from said reel, and while the drogue is not in contact with a probe of said receiver aircraft, rotating said hose reel in the hose retraction direction and sensing reaction torque on the hose reel (said reaction torque on said hose reel when said hose is being retracted, without the drogue being in contact with said probe, being referred to as "free retraction drag force");

(b) sensing said reaction torque after said receiver aircraft's probe engages said drogue (said reaction torque after said receiver aircraft's probe engages said drogue being referred to as "net drag force");

(c) after initial engagement of said probe with said drogue, rotating said hose reel in the hose retraction direction so that said hose is retracted;

(d) comparing said net drag force to said free retraction drag force;

(e) continuing to rotate said hose reel in the hose retraction direction with the hose winding on said reel until said net drag force has increased to at least as great as said free retraction drag force multiplied by a factor of K, where K is a predetermined value between approximately 0.2 and approximately 2; and (g) after said net drag force has increased to at least as great as K multiplied by said free retraction drag force, halting the rotation of said hose reel.

13. The method of claim 12 wherein the value of K is approximately 1.

14. The method of claim 12, wherein in step (a) said free retraction drag force is sensed while rotating said hose reel in the hose retraction direction so that said hose is retracted at a substantially constant hose speed.

15. The method of claim 14 wherein the value of K is approximately 1.

16. The method of claim 14, including the following additional steps:

(h) while said hose length is beyond said predetermined length and before initial engagement of said probe with said drogue, causing said hose reel to cease rotating, bringing said hose speed to zero, and sensing the reaction torque on the hose reel while the drogue is not in contact with said probe (said reaction torque on said hose reel when said hose speed is zero and while the drogue is not in contact with said probe being referred to as "free trail drag force"); and (i) after the rotation of said hose reel has been halted when said net drag force has increased to at least as great as K multiplied by said free retraction drag force, (i) holding said hose reel's rotation at a halt so long as said net drag force is at least as great as a first predetermined percentage of said free trail drag force and no greater than a second predetermined percentage of said recalculated free trail drag force;

(ii) rotating said hose reel in the hose retraction direction with the hose winding on said reel when said net drag force drops below said first predetermined percentage of said recalculated free trail drag force; and (iii) allowing said hose reel to rotate in the hose extension direction with the hose unwinding from said reel when said net drag force exceeds said second predetermined percentage of said recalculated free trail drag force.

17. The method of claim 16 wherein the value of K is approximately 1.

18. A method for controlling the deployment of a hose and drogue during aerial refueling of a receiver aircraft from a tanker aircraft, wherein said tanker aircraft includes a refueling system having a hose reel, with the hose wound around the reel such that said reel may rotate in a hose extension direction or in a hose retraction direction, said hose having an outlet end with said drogue affixed to said outlet end, said method comprising the following steps:

(a) after a predetermined length of hose has unwound from said reel, and while the drogue is not in contact with a probe of said receiver aircraft, rotating said hose reel in the hose retraction direction and sensing reaction torque on the hose reel (said reaction torque on said hose reel when said hose is being retracted, without the drogue being in contact with said probe, being referred to as "free retraction drag force");

(b) sensing said reaction torque after said receiver aircraft's probe engages said drogue (said reaction torque after said receiver aircraft's probe engages said drogue being referred to as "net drag force");

(c) while said receiver aircraft's probe is engaged with said drogue, comparing said net drag force to said free retraction drag force;

(d) before pumping of fuel from the tanker aircraft to the receiver aircraft has begun, when said net drag force is less than a predetermined percentage of said free retraction drag force, rotating said hose reel in the hose retraction direction so that said hose is retracted.

19. The method of claim 18, including the following additional step:

using a variable displacement hydraulic motor to cause the reel to rotate.

20. A method for controlling the deployment of a hose and drogue during aerial refueling of a receiver aircraft from a tanker aircraft, wherein said tanker aircraft includes a refueling system having a hose reel, with the hose wound around the reel such that said reel may rotate in a hose extension direction or in a hose retraction direction, said hose having an outlet end with said drogue affixed to said outlet end, said method comprising the following steps:

(a) after a predetermined length of hose has unwound from said reel, and while the drogue is not in contact with a probe of said receiver aircraft, rotating said hose reel in the hose retraction direction and sensing reaction torque on the hose reel (said reaction torque on said hose reel when said hose is being retracted, without the drogue being in contact with said probe, being referred to as "free retraction drag force");

(b) sensing said reaction torque after said receiver aircraft's probe engages said drogue (said reaction torque after said receiver aircraft's probe engages said drogue being referred to as "net drag force");

(c) while said receiver aircraft's probe is engaged with said drogue, comparing said net drag force to said free retraction drag force;

(d) before pumping of fuel from the tanker aircraft to the receiver aircraft has begun, when said net drag force is less than said free retraction drag force multiplied by a factor of K, where K is a predetermined value between approximately 0.2 and approximately 2, rotating said hose reel in the hose retraction direction so that said hose is retracted.

21. The method of claim 20, including the following additional step:

using a variable displacement hydraulic motor to cause the reel to rotate.

22. The method of claim 20, wherein K is equal to about 1.

23. A method for controlling the deployment of a hose and drogue during aerial refueling of a receiver aircraft from a tanker aircraft, wherein said tanker aircraft includes a refueling system having a hose reel, with the hose wound around the reel such that said reel may rotate in a hose extension direction or in a hose retraction direction, said hose having an outlet end with said drogue affixed to said outlet end, said method comprising the following steps:

(a) after a predetermined length of hose has unwound from said reel, and while the drogue is not in contact with a probe of said receiver aircraft, rotating said hose reel in the hose retraction direction and sensing reaction torque on the hose reel (said reaction torque on said hose reel when said hose is being retracted, without the drogue being in contact with said probe, being referred to as "free retraction drag force");

(b) sensing said reaction torque after said receiver aircraft's probe engages said drogue (said reaction torque after said receiver aircraft's probe engages said drogue being referred to as "net drag force");

(c) while said receiver aircraft's probe is engaged with said drogue, comparing said net drag force to said free retraction drag force;

(d) when said net drag force is less than a predetermined percentage of said free retraction drag force, rotating said hose reel in the hose retraction direction with the hose being retracted at about said predetermined maximum allowable hose speed until said net drag force has increased to at least said predetermined percentage of said free retraction drag force;

(e) after said net drag force has increased to at least said predetermined percentage of said free retraction drag force, halting the rotation of said hose reel, and (f) after pumping of fuel from the tanker aircraft to the receiver aircraft has ended, rotating said hose reel in the hose retraction direction so that said hose is retracted at about a second predetermined retraction speed, said second predetermined retraction speed being less than said predetermined maximum allowable hose speed.

24. The method of claim 23, including the following additional step:

using a variable displacement hydraulic motor to cause the reel to rotate.

25. A method for controlling the deployment of a hose and drogue during aerial refueling of a receiver aircraft from a tanker aircraft, wherein said tanker aircraft includes a refueling system having a hose reel, with the hose wound around the reel such that said reel may rotate in a hose extension direction or in a hose retraction direction, said hose having an outlet end with said drogue affixed to said outlet end, said method comprising the following steps:

(a) after a predetermined length of hose has unwound from said reel, and while the drogue is not in contact with a probe of said receiver aircraft, rotating said hose reel in the hose retraction direction and sensing reaction torque on the hose reel (said reaction torque on said hose reel when said hose is being retracted, without the drogue being in contact with said probe, being referred to as "free retraction drag force");

(b) sensing said reaction torque after said receiver aircraft's probe engages said drogue (said reaction torque after said receiver aircraft's probe engages said drogue being referred to as "net drag force");

(c) while said receiver aircraft's probe is engaged with said drogue, comparing said net drag force to said free retraction drag force;

(d) rotating said hose reel in the hose retraction direction with the hose being retracted at about said predetermined maximum allowable hose speed until said net drag force has increased to at least as great as said free retraction drag force multiplied by a factor of K, where K is a predetermined value between approximately 0.2 and approximately 2;

(e) after said net drag force has increased to at least as great as K multiplied by said free trail drag force, halting the rotation of said hose reel, and (f) after pumping of fuel from the tanker aircraft to the receiver aircraft has ended, rotating said hose reel in the hose retraction direction so that said hose is retracted at about a second predetermined retraction speed, said second predetermined retraction speed being less than said predetermined maximum allowable hose speed.

26. The method of claim 25, including the following additional step:

using a variable displacement hydraulic motor to cause the reel to rotate.

27. The method of claim 25, wherein K is equal to about 1.

28. A method for controlling the deployment of a hose and drogue during aerial refueling of a receiver aircraft from a tanker aircraft, wherein said tanker aircraft includes a refueling system having a hose reel, with the hose wound around the reel such that said reel may rotate in a hose extension direction or in a hose retraction direction, said hose having an outlet end with said drogue affixed to said outlet end, said method comprising the following steps:

(a) after a predetermined length of hose has unwound from said reel, and while the drogue is not in contact with a probe of said receiver aircraft, rotating said hose reel in the hose retraction direction and sensing reaction torque on the hose reel (said reaction torque on said hose reel when said hose is being retracted, without the drogue being in contact with said probe, being referred to as "free retraction drag force");

(b) sensing said reaction torque after said receiver aircraft's probe engages said drogue (said reaction torque after said receiver aircraft's probe engages said drogue being referred to as "net drag force");

(c) while said receiver aircraft's probe is engaged with said drogue, comparing said net drag force to said free retraction drag force;

(d) before pumping of fuel from the tanker aircraft to the receiver aircraft has begun, when said net drag force is less than a predetermined percentage of said free retraction drag force, rotating said hose reel in the hose retraction direction so that said hose is retracted at about a predetermined maximum allowable hose speed; and (e) after pumping of fuel from the tanker aircraft to the receiver aircraft has ended, rotating said hose reel in the hose retraction direction so that said hose is retracted at about a second predetermined retraction speed, said second predetermined retraction speed being less than said predetermined maximum allowable hose speed.

29. The method of claim 28, including the following additional step:

using a variable displacement hydraulic motor to cause the reel to rotate.

30. A method for controlling the deployment of a hose and drogue during aerial refueling of a receiver aircraft from a tanker aircraft, wherein said tanker aircraft includes a refueling system having a hose reel, with the hose wound around the reel such that said reel may rotate in a hose extension direction or in a hose retraction direction, said hose having an outlet end with said drogue affixed to said outlet end, said method comprising the following steps:

(a) after a predetermined length of hose has unwound from said reel, and while the drogue is not in contact with a probe of said receiver aircraft, rotating said hose reel in the hose retraction direction and sensing reaction torque on the hose reel (said reaction torque on said hose reel when said hose is being retracted, without the drogue being in contact with said probe, being referred to as "free retraction drag force");

(b) sensing said reaction torque after said receiver aircraft's probe engages said drogue (said reaction torque after said receiver aircraft's probe engages said drogue being referred to as "net drag force");

(c) after initial engagement of said probe with said drogue and before pumping of fuel from the tanker aircraft to the receiver aircraft has begun, rotating said hose reel in the hose retraction direction so that said hose is retracted at about a predetermined maximum allowable hose speed;

(d) comparing said net drag force to said free retraction drag force;

(e) continuing to rotate said hose reel in the hose retraction direction with the hose being retracted at about said predetermined maximum allowable hose speed until said net drag force has increased to at least as great as said free retraction drag force multiplied by a factor of K, where K is a predetermined value between approximately 0.2 and approximately 2;

(f) after said net drag force has increased to at least as great as K multiplied by said free retraction drag force, halting the rotation of said hose reel, and (g) after pumping of fuel from the tanker aircraft to the receiver aircraft has ended, rotating said hose reel in the hose retraction direction so that said hose is retracted at about a second predetermined retraction speed, said second predetermined retraction speed being less than said predetermined maximum allowable hose speed.

31. The method of claim 30, including the following additional step:

using a variable displacement hydraulic motor to cause the reel to rotate.

32. The method of claim 30, wherein K is equal to about 1.

33. A method for controlling the deployment of a hose and drogue during aerial refueling of a receiver aircraft from a tanker aircraft, wherein said tanker aircraft includes a refueling system having a hose reel, with the hose wound around the reel such that said reel may rotate in a hose extension direction or in a hose retraction direction, said hose having an outlet end with said drogue affixed to said outlet end, said method comprising the following steps:

(a) after a predetermined length of hose has unwound from said reel, and while the drogue is not in contact with a probe of said receiver aircraft, rotating said hose reel in the hose retraction direction and sensing reaction torque on the hose reel (said reaction torque on said hose reel when said hose is being retracted, without the drogue being in contact with said probe, being referred to as "free retraction drag force");

(b) sensing said reaction torque after said receiver aircraft's probe engages said drogue (said reaction torque after said receiver aircraft's probe engages said drogue being referred to as "net drag force");

(c) after initial engagement of said probe with said drogue, rotating said hose reel in the hose retraction direction so that said hose is retracted at about a predetermined maximum allowable hose speed;

(d) comparing said net drag force to said free retraction drag force;

(e) continuing to rotate said hose reel in the hose retraction direction with the hose being retracted at about said predetermined maximum allowable hose speed until said net drag force has increased to at least as great as said free retraction drag force multiplied by a factor of K, where K is a predetermined value between approximately 0.2 and approximately 2;

(f) after said net drag force has increased to at least as great as K multiplied by said free retraction drag force, halting the rotation of said hose reel, and (g) after pumping of fuel from the tanker aircraft to the receiver aircraft has ended, rotating said hose reel in the hose retraction direction so that said hose is retracted at about a second predetermined retraction speed, said second predetermined retraction speed being less than said predetermined maximum allowable hose speed.

34. The method of claim 33, including the following additional step:

using a variable displacement hydraulic motor to cause the reel to rotate.

35. The method of claim 33, wherein K is equal to about 1.

36. A method for controlling the deployment of a hose and drogue during aerial refueling of a receiver aircraft from a tanker aircraft, wherein said tanker aircraft includes a refueling system having a hose reel, with the hose wound around the reel such that said reel may rotate in a hose extension direction or in a hose retraction direction, said hose having an outlet end with said drogue affixed to said outlet end, said method comprising the following steps:

(a) after a predetermined length of hose has unwound from said reel, stopping rotation of said reel and, while the drogue is not in contact with a probe of said receiver aircraft, maintaining said hose's speed at zero;

(b) while said hose's speed is maintained at zero with said drogue not in contact with said probe, sensing reaction torque on the hose reel (said reaction torque on said hose reel when said hose's speed is zero with said drogue not in contact with said probe being referred to as "free trail drag force");

(c) sensing said reaction torque after said receiver aircraft's probe engages said drogue (said reaction torque after said receiver aircraft's probe engages said drogue being referred to as "net drag force");

(d) while said receiver aircraft's probe is engaged with said drogue, comparing said net drag force to said free trail drag force;

(e) before pumping of fuel from the tanker aircraft to the receiver aircraft has begun, when said net drag force is less than a predetermined percentage of said free trail drag force, rotating said hose reel in the hose retraction direction so that said hose is retracted at about a predetermined maximum allowable hose speed; and (f) after pumping of fuel from the tanker aircraft to the receiver aircraft has ended, rotating said hose reel in the hose retraction direction so that said hose is retracted at about a second predetermined retraction speed, said second predetermined retraction speed being less than said predetermined maximum allowable hose speed.

37. The method of claim 36, including the following additional step:

using a variable displacement hydraulic motor to cause the reel to rotate.

38. A method for controlling the deployment of a hose and drogue during aerial refueling of a receiver aircraft from a tanker aircraft, wherein said tanker aircraft includes a refueling system having a hose reel, with the hose wound around the reel such that said reel may rotate in a hose extension direction or in a hose retraction direction, said hose having an outlet end with said drogue affixed to said outlet end, said method comprising the following steps:

(a) after a predetermined length of hose has unwound from said reel, stopping rotation of said reel and, while the drogue is not in contact with a probe of said receiver aircraft, maintaining said hose's speed at zero;

(b) while said hose's speed is maintained at zero with said drogue not in contact with said probe, sensing reaction torque on the hose reel (said reaction torque on said hose reel when said hose's speed is zero with said drogue not in contact with said probe being referred to as "free trail drag force");

(c) sensing said reaction torque after said receiver aircraft's probe engages said drogue (said reaction torque after said receiver aircraft's probe engages said drogue being referred to as "net drag force");

(d) while said receiver aircraft's probe is engaged with said drogue, comparing said net drag force to said free trail drag force;

(e) rotating said hose reel in the hose retraction direction with the hose being retracted at about said predetermined maximum allowable hose speed until said net drag force has increased to at least as great as said free trail drag force multiplied by a factor of K, where K is a predetermined value between approximately 0.2 and approximately 2;

(f) after said net drag force has increased to at least as great as K multiplied by said free trail drag force, halting the rotation of said hose reel, and (g) after pumping of fuel from the tanker aircraft to the receiver aircraft has ended, rotating said hose reel in the hose retraction direction so that said hose is retracted at about a second predetermined retraction speed, said second predetermined retraction speed being less than said predetermined maximum allowable hose speed.

39. The method of claim 38, including the following additional step:

using a variable displacement hydraulic motor to cause the reel to rotate.

40. The method of claim 20, wherein K is equal to about 1.

* * * * *